L. M. TODD & C. G. TIEFEL.
CHECK WRITING MACHINE.
APPLICATION FILED NOV. 11, 1912.

1,240,903.

Patented Sept. 25, 1917.
7 SHEETS—SHEET 1.

Inventors
Libanus M. Todd
Charles G. Tiefel

Witnesses
Walter B. Payne
Nelson H. Copp

By
Their Attorneys

UNITED STATES PATENT OFFICE.

LIBANUS M. TODD AND CHARLES G. TIEFEL, OF ROCHESTER, NEW YORK, ASSIGNORS, BY MESNE ASSIGNMENTS, TO TODD PROTECTOGRAPH COMPANY, OF ROCHESTER, NEW YORK, A CORPORATION OF NEW YORK.

CHECK-WRITING MACHINE.

1,240,903.　　　Specification of Letters Patent.　　Patented Sept. 25, 1917.

Application filed November 11, 1912. Serial No. 730,563.

*To all whom it may concern:*

Be it known that we, LIBANUS M. TODD and CHARLES G. TIEFEL, of Rochester, in the county of Monroe and State of New York, have invented certain new and useful Improvements in Check-Writing Machines; and we do hereby declare the following to be a full, clear, and exact description of the same, reference being had to the accompanying drawings, forming a part of this specification, and to the reference-numerals marked thereon.

Our present invention relates to printing apparatus, and, more particularly, to printing machines of a character adapted for printing or marking legends upon checks, drafts or other paper forms. One object of the invention is to provide an efficient and convenient machine of this nature having a plurality of characters suitable for printing a wide range of amounts or monetary values, whereby the exact amount for which any check or other instrument is drawn may be marked thereon to protect it against fraudulent alteration.

Our invention has for its further object to provide in such a machine a type carrier having a plurality of type characters of different lengths representing a series of words expressing various amounts and adjustable to bring said characters selectively to printing position, in conjunction with a mechanism for effecting in connection with each impression a relative feeding movement between the type carrier and the work corresponding in extent to the length of the character printed.

A further object is to provide a machine of the character indicated having a work support arranged to be moved in connection with each impression to feed the work a distance corresponding to the length of the character impressed.

These and other objects and advantages will be fully described in the following detailed description of one embodiment of the invention selected by way of illustration and shown in the accompanying drawings, in which:—

Fig. 13 is a detail view illustrating the operation of the locking pin which centers and arrests the movement of the printing wheel;

Similar reference numerals throughout the several figures indicate the same parts.

The machine forming our present embodiment of the invention is adapted to print or emboss upon a check, draft or other commercial paper any sum within the limits of practical banking requirements. In general it comprises a movable type carrier or printing member preferably in the form of a wheel having thereon a plurality of type forms for printing the necessary words and characters, the type forms being brought by movement of the wheel, selectively into register with a movable platen together with a carriage for holding the check or draft which is moved intermittently after each printing impression to feed the work and means for controlling the extent of the feeding movement of the carriage to correspond to the length of the word which may have been printed.

Figure 2:
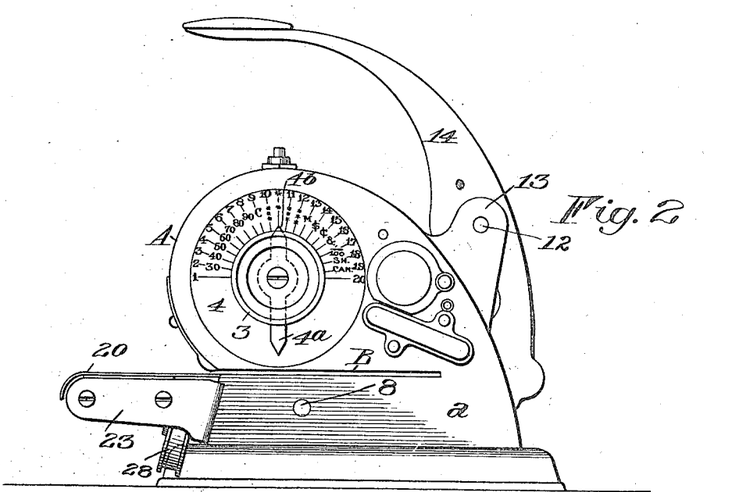
Fig. 2 is an end elevation.
Figure 4:
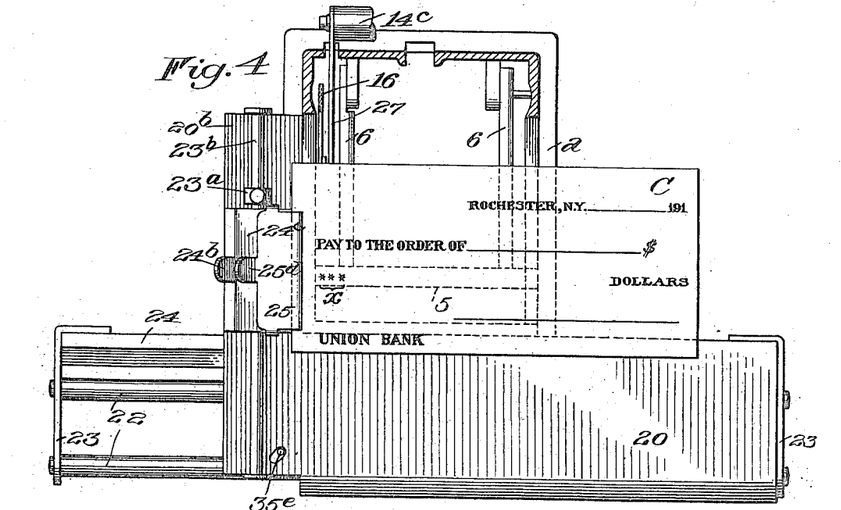
Fig. 4 is a horizontal sectional view taken on the line 4×—4× of Fig. 1, the feeding carriage being shown in its initial position.
Figure 5:
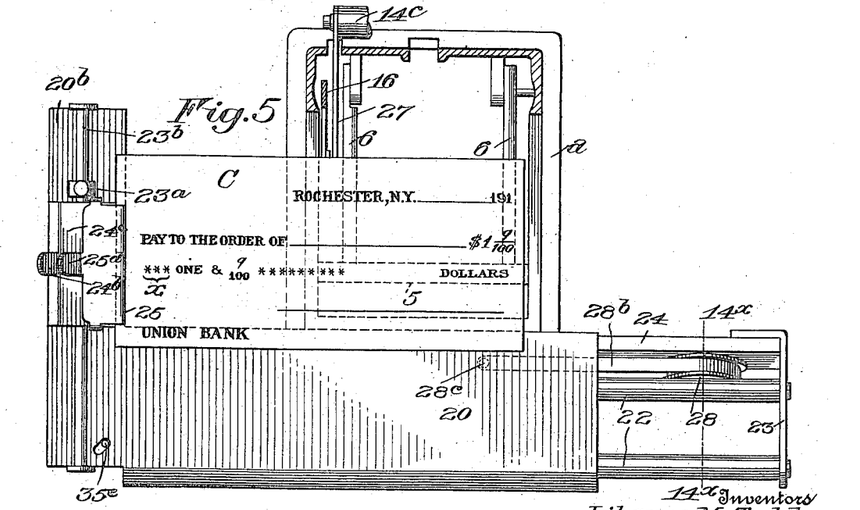
Fig. 5 is a similar view showing said carriage in the position which it occupies at the completion of the printing operation.

In illustrating one embodiment of the invention, a machine is shown comprising the main frame or casing, the upper part A of which contains the type carrier or printing wheel overhanging the base a containing the platen so that a work receiving slot or space B is provided in which the check or draft indicated by C, Figs. 4 and 5 may be inserted and occupy a position between the printing wheel and the platen. In the present instance, the type carrier or printing wheel 1 is carried on the shaft 2 at one end of which is a manually operable type selecting member or knob 3, by means of which it may be revolved. Disposed equi-distantly from one another about the circumference of the wheel and preferably at one edge, are type forms representing the words reading consecutively from "one" to "twenty"; others reading "thirty", "forty", "fifty", "sixty", "seventy", "eighty", "ninety", "one hundred", and "one thousand", and still other rows of type spaces are devoted to single field characters such as a star, or plurality of stars, and characters other than numerals while in appropriate type rows appears the dollar sign, a suitable character indicating cents, a fractional denomination of the fraction one hundred, the words "Shares", "Cancel", "Marks", "Francs", or other inscriptions which it may be desired to apply to negotiable instruments. On the exterior of the casing there is applied a suitable index 4 bearing indices corresponding to the rows of type on the wheel and arranged in two concentric semi-circular rows, as shown in Fig. 2, with which coöperate relatively long and short index fingers 4ª and 4ᵇ carried on the knob 3, which will respectively indicate at all times the particular row of type which is in printing position in reference to the platen.

Figures 9, 14, 15:
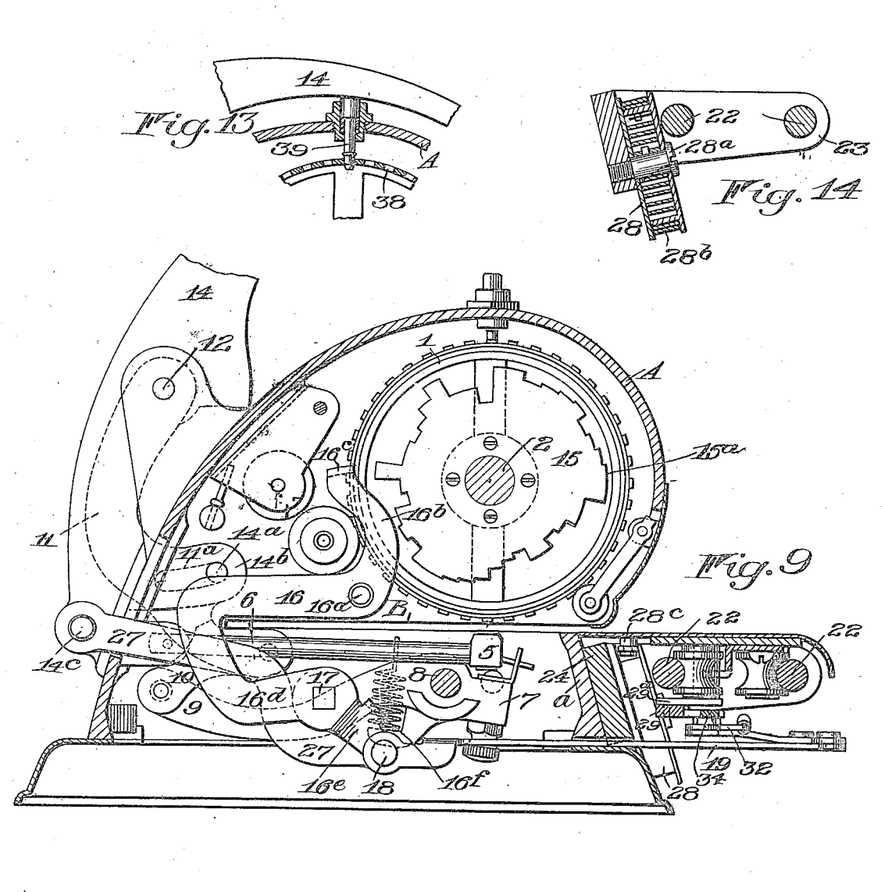
Fig. 9 is a transverse sectional view taken on the line 9×—9× of Fig. 6, the parts being shown in their normal position.
Fig. 14 is a sectional view on the line 14×—14× of Fig. 5, illustrating the spring balance for returning the carriage to its normal position.
Figures 10, 11, 12:
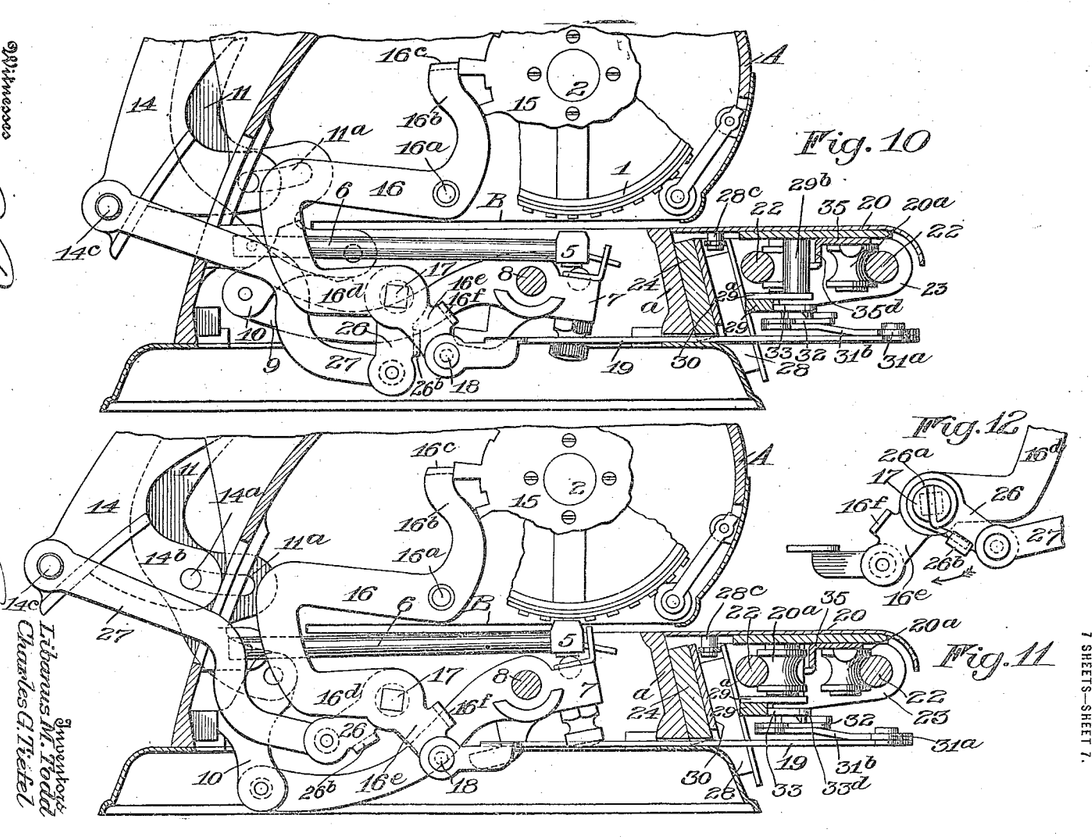
Figs. 10 and 11 are similar views illustrating the conjoint operation of the printing mechanism and the carriage feeding devices.
Fig. 12 is a detail view of the yielding connection between the feed control lever and its operating member looking in the direction of the arrows on the line 12×—12× of Fig. 6.

The platen 5 as shown particularly in Figs. 9, 10 and 11, is in the shape of a bar, the upper side of which forms a single impression surface adapted for coaction with all of said type forms, and the platen is supported for vertical movement upon pivoted arms 6, its movement being effected by a lever 7 swinging upon a shaft 8 and having a rearwardly extending end 9 connected by the toggle links 10 with an operating lever 11, the outer end of which projects from the rear of the casing A and is pivoted on the pin 12 carried between the ears or bosses 13 on said casing. This operating lever is moved by the main actuating means or lever 14, the upper end of which extends forwardly over the top of the machine while its opposite extremity extends downwardly and is slotted to accommodate the operating lever 11. The feeding mechanism of the work carriage is also actuated by the lever 14 as will be later described, and for this reason, a slotted connection is provided between the actuating member 14 and the platen operating member 11 for the purpose of permitting the feeding devices of the carriage to be advanced into operative position during the first part of the movement of the lever 14 and then allowing the platen to be moved upwardly into engagement with the type wheel. This relative movement of the parts is obtained by providing the lever 11 with a slot 11ª receiving a pin 14ª fixed in ears 14ᵇ at the lower end of the actuating member 14.

As the machine forming the present embodiment of the invention operates to print in succession upon the appropriate line of the check the words expressing its value, and as these words are of varying lengths, there is preferably provided a mechanism for feeding the work carriage after each impression a distance equal to the length of the character impressed and a small additional distance to provide a uniform space between adjacent words. To this end there is preferably employed a gage or stop member 15 rigidly attached to the shaft 2 and having the irregular outline composed of the stop shoulders 15ª, dedicated one to each line of type on the face of the printing wheel, each of said stop shoulders being arranged at a radial distance from the center of the shaft 2 inversely proportional to the length of its corresponding line of type and so disposed as to control the advance or feeding movement of the check carrier by coöperation with a suitable controlling member or part of such feeding mechanism. In the present instance, such coöperating or controlling part of the feeding mechanism comprises a member or lever 16 pivoted at 16ª, having the upwardly extending end 16ᵇ provided with an offset finger 16ᶜ disposed to move in a direction substantially radial of the shaft 2 and to coöperate with any one of the stop shoulders 15ª which may be brought into its path of movement. The member 16 is given the hook shape shown in order to extend it in rear of the check slot B, so that it will not intercept the path of movement of a check or draft at any time during the printing operation, and its lower end 16ᵈ extends forwardly beneath the check slot where it carries the stud 17 and thence downwardly as indicated by 16ᵉ where it is provided with the pivot 18 of the connecting rod 19 which projects forwardly through an aperture in the base a of the casing and serves as the means for operating the feeding devices of the carriage.

The carriage and the feeding mechanism by means of which it is actuated are mounted at the front of the casing and supported on the lower portion a of the casing, the upper edge or face of the carriage being disposed in the plane of the lower edge of the check slot B. The carriage proper comprises a plate 20 carrying on its under side rollers 20ª, which are grooved to fit parallel guide bars 22 supported at their ends in brackets 23 projecting forwardly from a cross bar 24 rigidly attached to the forward edge or face of the base a. The carriage thus mounted is movable in a direction parallel to the axis of the printing wheel and transversely of its face, and the mechanism for advancing the carriage causes its movement in a direction from the right hand side of the machine, as shown in full lines in Figs. 1 and 4, toward the left hand side, as shown in Fig. 5. At its left hand end the carriage plate 20 extends rearwardly as indicated by 20ᵇ and on this extension is a guide 23ᵇ on which is mounted an adjustable check clamp which may be moved forwardly or rearwardly to position checks or drafts of different design so that the blank spaces provided thereon in which the amounts expressing monetary value are to be filled in, will be placed between the platen and printing wheel. When the machine is used continuously with checks or drafts of given size, the position of the carriage will be determined by an adjustable stop 23ª. The check clamp mounted on guide 23ᵇ is illustrated particularly in Fig. 15 and its parts are preferably formed of sheet metal. One portion of the clamp comprises a base 24ᶜ rectangular in shape having a relatively broad surface, resting upon the face of the part 20ᵇ of the carriage and having at its forward end a lip or extension 24ª against which the edge of the paper to be printed upon is clamped by the movable jaw 25, preferably carrying a rubber clamping strip 25ª. The jaw 25 is pivoted at 25ᵇ and held in engagement with the lip 24ª by the spring 25ᶜ against the tension of which it may be moved by pressure of the operator's fingers upon the two ears 24ᵇ and 25ᵈ. The feeding mechanism by means of which the carriage is advanced after each printing operation, or movement of the platen 5, is arranged beneath the carriage and in the arrangement of the parts shown as one embodiment of the present invention, said feeding mechanism comprises a toothed rack, and a feeding pawl coöperating therewith, which may be advanced the distance of several teeth according to the length of the word or character, or the number of type spaces required to print the selected word or character, the amplitude of movement being governed by the controlling member 16, which it will be remembered is arrested in one position or another by one of the various stops 15ª on the type wheel. The feeding mechanism also embodies a detent for retaining the carriage in adjusted position together with means for releasing it and the feeding pawl to permit the carriage to return to its normal position, said releasing devices being also adapted to coöperate with the check clamp to the end that they may be thrown into operation when the check or draft is placed in the clamp and the latter is adjusted to position the check and likewise released when the clamp is returned to its forward or normal position on the carriage.

More specifically describing the details of the mechanism above described, reference is first made to Figs. 9, 10 and 11, which illustrate successively the different positions assumed by the parts during the movement of the actuating member 14. Referring now to the means by which movement is imparted to the controlling member 16 and the connecting rod 19, it will be observed that the stud 17 is rigidly connected to the member 16 and pivoted thereon is a depending link 26 which is of about the same dimensions as the depending end 16ᵉ of the member 16 (Fig. 12). The link 26 is connected with the stud 17 by the coil spring 26ª, which serves to rotate the link in the direction indicated by the arrow so that the stop 26ᵇ normally rests in engagement with the stop 16ᶠ. The link 26 is connected by the bent plate 27 with the actuating member 14, the latter being provided at its lower end with an offset or extension 14ᶜ, as shown particularly in Fig. 3, so that the member 27 moves in the plane of movement of the link 26 which, it will be noticed, is arranged with the member 16 adjacent the inner wall of the casing A and at the end of the printing wheel. The connection between the actuating member 14, and the carriage feeding mechanism formed by the link 26 and the coil spring 26ª is a yielding connection which permits the carriage feeding mechanism to be set in operative condition during the initial movement of the lever 14, and there held, while the operator continues to depress the actuator 14, until the platen 5 is brought into contact with the printing wheel (by reason of engagement of the pin 14ª with lever 11) and subsequently disengaged to free the check. The controlling member 16 rotates slightly about its pivot 16ª thus affording a reciprocatory movement to its lower end 16ᵉ which may be of greater or less moment according to the length of the stop 15ª lying in position to coöperate with the upper end 16ᶜ of said lever, as before explained. The reciprocatory movement thus imparted to the connecting rod 19 in turn actuates the feeding pawl by which the carriage is advanced.

Figure 1:
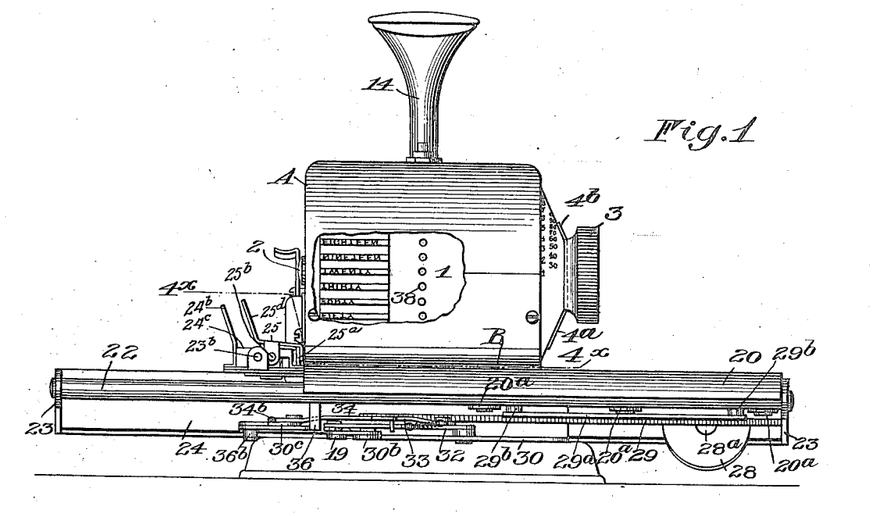
Figure 1 is a front elevation of a check writing machine constructed in accordance with our present invention.
Figures 3, 15:
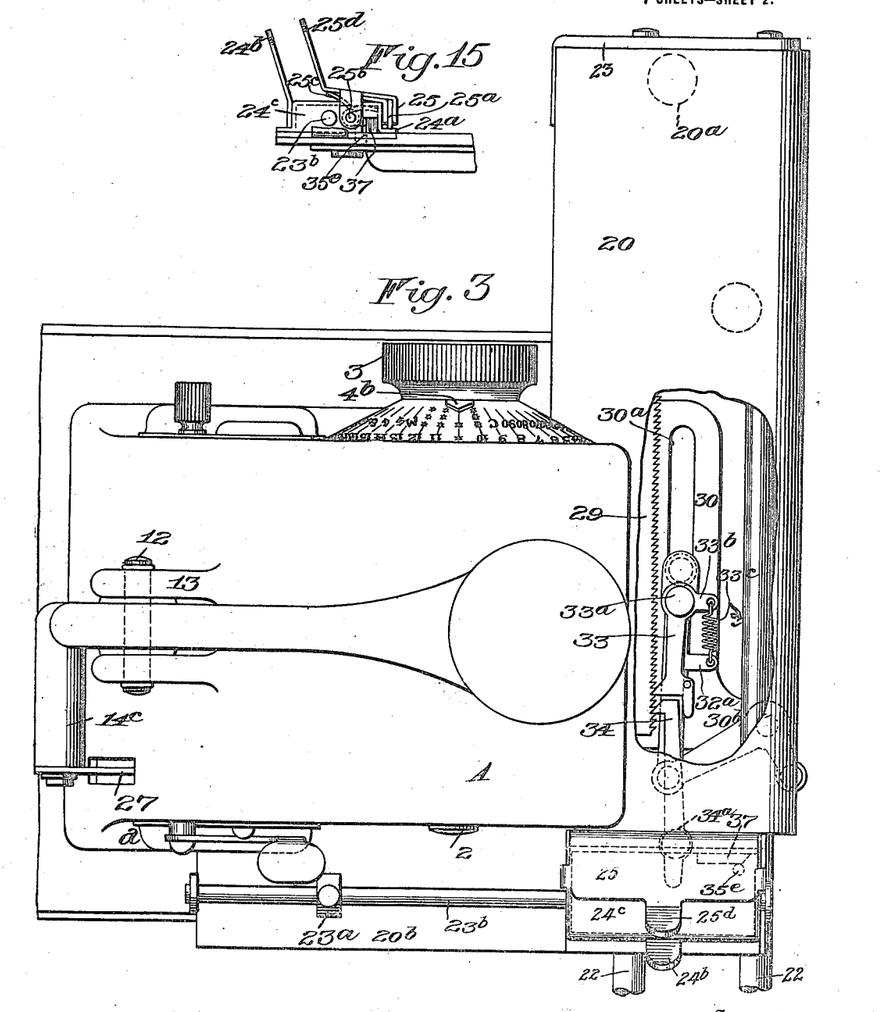
Fig. 3 is a top plan view.
Fig. 15 is an enlarged side elevation of the check clamp and slide.

The carriage 20 is retracted toward the right hand ends of the guides 22 in the position shown in Figs. 1 and 3 by means of a spring balance 28 (Fig. 14) of the usual or any preferred construction, the one shown embodying a circular casing containing a coil spring. It is pivoted on the stud 28ª and is provided exteriorly with a tape 28ᵇ which is unwound therefrom as the carriage is advanced, the free end of the tape being connected to said carriage by a post 28ᶜ. Rigidly attached to the carriage, but spaced from the under side thereof beneath one of the guides 22 is a rack bar 29 with ratchet teeth along one edge, said bar being supported on the under side of the plate 29ᵃ which is rigidly connected to the carriage 20 by the screw posts or studs 29ᵇ, as shown particularly in Fig. 10. Extending outwardly from the base $a$ of the machine, beneath the carriage, is a stationary bracket 30 provided with a slot 30ᵃ in front of and parallel to the ratchet tooth edge of the bar 29. One end of this bracket extends forwardly as indicated by 30ᵇ and carries the pivot 31 of a bell crank lever comprising the arm 31ᵃ, attached to the connecting rod 19, and the arm 31ᵇ, attached to and reciprocating the sliding member 32 which is guided in the slot 30ᵃ. The carriage feeding pawl, indicated by 33, is provided on the slide 32 at the point 33ᵃ in rear of which is carried the extension or finger 33ᵇ, connected by the spring 33ᶜ to the projection 32ᵃ on slide 32 for the purpose of rotating the pawl 33 in a direction toward the rack 29 and to hold it in engagement with the teeth thereof, although permitting it to yield when the member 32 is moved in one direction. The retaining pawl which holds the carriage in its operative position is indicated by 34 and is also pivoted to the stationary bracket 30 at the point 34ᵃ and is held in yielding engagement with the rack by the spring 34ᵇ one end of which is connected to the end 34ᶜ of said pawl and the other to a curved finger 30ᶜ of the bracket.

Figure 6:
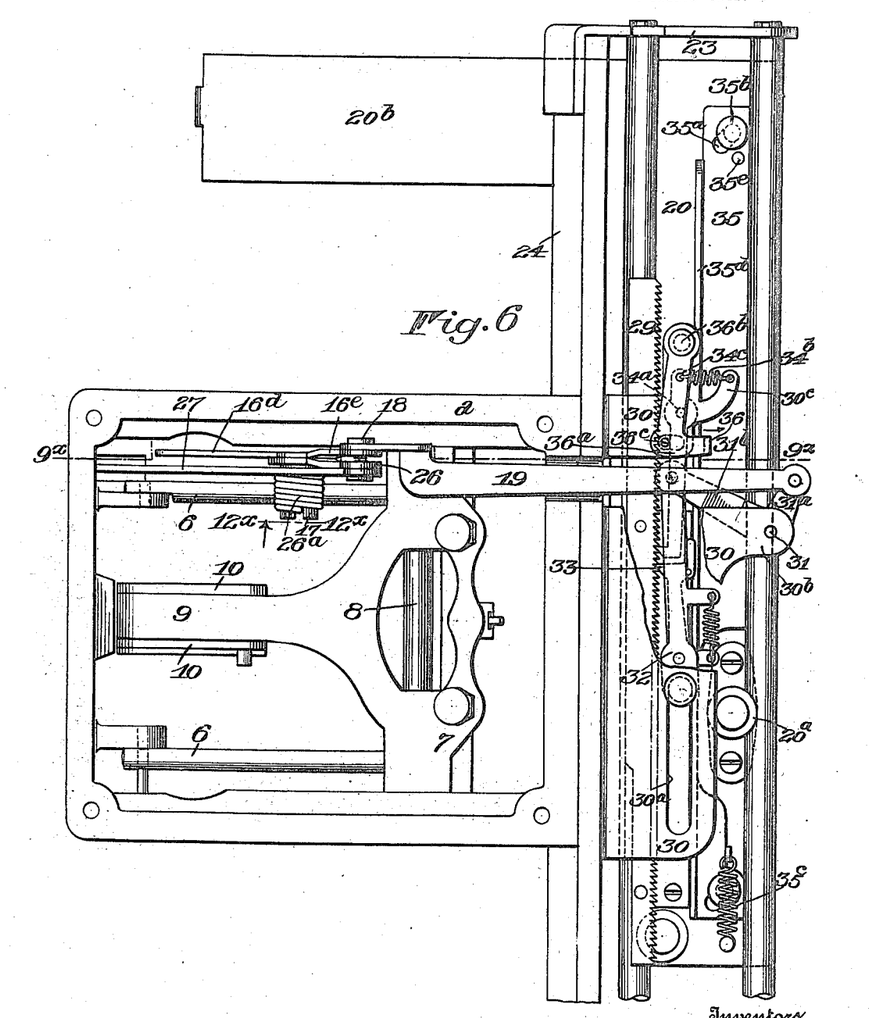
Fig. 6 is a bottom plan view, the machine being inverted and disclosing the carriage feeding devices.
Figure 7:
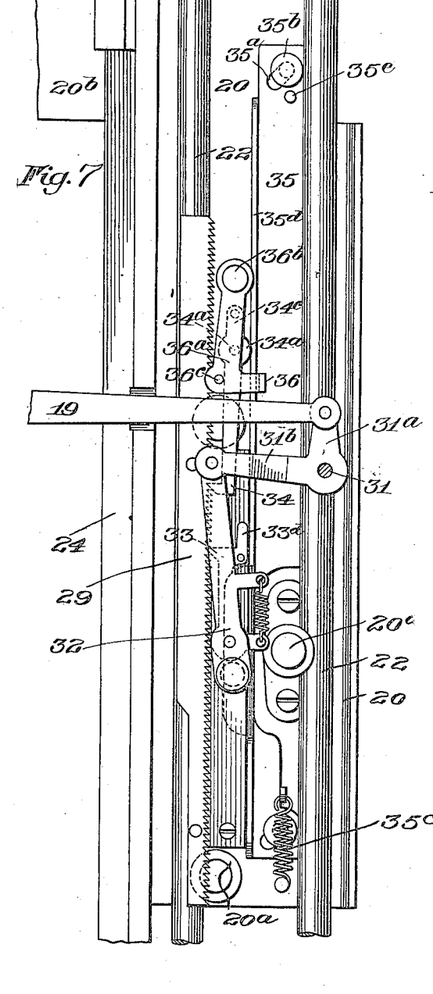
Figs. 7 and 8 are similar views illustrating in detail the operation of the feeding mechanism of the carriage.
Figure 8:
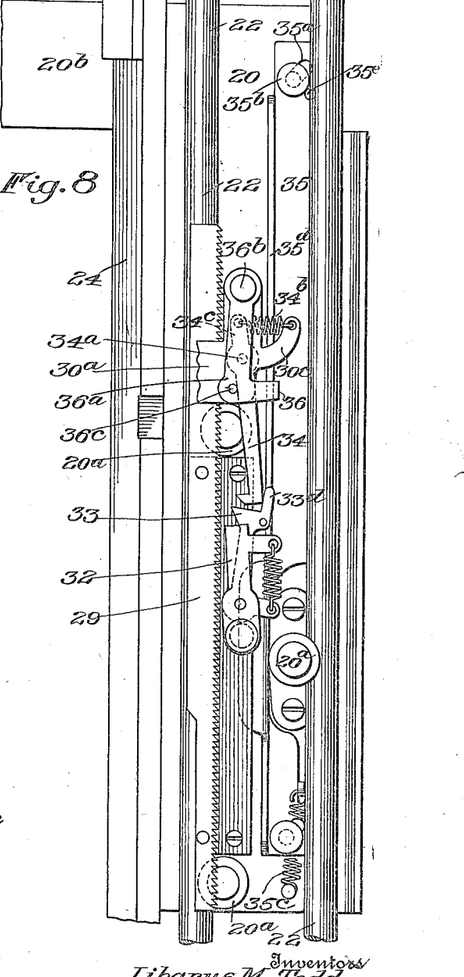

In order to return the carriage to its normal position a releasing device is provided thereon, to retract the feeding pawl 33 and the locking detent 34, which may be operated either manually or automatically by the adjustment of the check clamp on its guide 23. In the present instance the releasing device comprises a movable plate 35 on the under side of the carriage which is guided thereon to move both longitudinally and transversely or in a direction diagonally of the carriage, it being provided at its two ends with inclined slots 35ᵃ coöperating with the pins 35ᵇ. The plate is normally held in the inoperative position as shown in Fig. 6, by the retractile spring 35ᶜ. Coöperative action between the pawls and the plate 35 is obtained by providing the latter with a depending rib or edge 35ᵈ, which in all positions of the carriage lies in rear of the upturned finger 36 on a pivoted arm 36ᵃ rotating about the stud 36ᵇ on the bracket 30, said arm carrying a pin 36ᶜ, which coöperates with the edge of the detent 34 to retract the latter into the inoperative position as shown in Fig. 8. When the detent 34 is disengaged from the rack, the feeding pawl should also be retracted and in order that these pawls may be simultaneously disengaged from the rack the feeding pawl 33 is provided with a finger or projection 33ᵈ which overlies the end of the pawl 34 and is retracted with the latter and by it held out of engagement with the rack 29. The reciprocation of the releasing plate 35 is effected by the pin 35ᵉ thereon which projects upwardly through the carriage 20 at its left hand end where it may be engaged by the finger of the operator, or by a cam 37 on the part 24 of the check clamp, as shown in dotted lines in Fig. 3. It is preferred, however, that these parts be arranged so that the carriage will not be released except by the check clamp as this insures the check clamp being properly positioned in readiness to receive a check or draft each time the carriage is returned to its normal position.

In a machine of this character it is essential that the printing member be accurately centered before the printing operation is attempted and as a simple means of accomplishing this object the type wheel is provided with perforations 38, as shown in Figs. 1 and 13, in alinement with the respective rows of type with which coöperates the spring operated plunger 39, located in the top of the casing A beneath the actuating member 14 and in such position that the movement of the latter will be arrested unless the plunger is in alinement with and can enter one of the apertures 38.

In the normal position of the parts, the carriage 20 and the check clamp occupy the position shown in Fig. 3, that is to say, the carriage rests in its extreme right hand position and the check clamp is drawn forwardly on its guide 23ᵇ so that the operator may conveniently insert the end of a check or draft between the jaws 24ᵃ and 25ᵃ. At this time, only the upper edge of the check or draft lies in the slot B between the upper and lower parts of the casing A—$a$ so that the blank spaces of the check which are to be filled in can be fully observed. Then the operator moves the clamp and the attached check rearwardly of the machine, the movement of the clamp being preferably limited by the stop 23ᵃ. The check now rests in the position shown in Fig. 4 with the space thereon which is provided to receive the amount indicating words or characters in proper printing position between the printing wheel and the platen. By means of the knob 3 the type wheel is rotated to select and position the desired printing characters. The first impression would preferably be a terminal character such as stars or asterisks, as indicated by Figs. 4 and 5, preceding the amount indicating word or words. The latter may be any one of the several words provided upon the face of the printing wheel or a group of such words, as will be understood, each of said words or characters being impressed by a separate operation of the actuating member 14. In expressing an amount in the term cents, the appropriate word may be employed followed by the word "cents", but in order to lessen the printing operation; shorten the printed row of words and also safeguard the total amount against alteration, it is preferred to express the decimals in the form of fractions in which event the denominator "100" is the only portion of the fraction which is printed, the numerator being filled in by pen after the check is removed from the check writing machine.

Upon the completion of the printing operation the check clamp is moved to the front edge of the carriage where the cam 37 engaging the pin 35$^e$ causes a movement of the plate 35 in an outward direction sufficient to trip the detent 34 and the feeding pawl 33 at which time the tension device 28 will return the carriage to its original position.

We claim as our invention:

1. In a printing apparatus, the combination with a printing wheel, provided with a plurality of rows of type characters of different lengths, a platen arranged beneath it and feeding devices movable in a direction transversely of the printing wheel, an irregular shaped stop plate attached to the wheel and provided with shoulders arranged at different distances from its center of movement, of a member for actuating the feeding devices, a controlling member connected to it and coöperating with the shoulders on said stop plate, an actuating lever for operating the platen into engagement with the printing wheel and a yielding connection between said platen actuating lever, the feeding member and the controlling member.

2. In a printing machine, the combination with a wheel having a plurality of rows of printing characters thereon, a platen coöperating therewith and means for operating it, of a carriage, feeding devices for moving it comprising an operating member arranged to be moved in one direction upon movement of the platen into printing position, a yielding link connection between said member and the platen operating means, and a spring for returning said operating means to its normal position, and actuating the carriage.

3. In a printing machine, the combination with a wheel having a plurality of rows of type characters of different lengths arranged thereon and provided with a plurality of radially disposed stops of different lengths, a platen coöperating with the printing wheel and a controlling member coöperating with said stops, of an actuating member and operating connections between it and the platen and said controlling member, a carriage, devices for moving it and a member for actuating said devices connected to said controlling member and set in operative position by the movement of the controlling member in one direction and a spring for operating said member in the opposite direction and restoring the controlling member.

4. In a printing machine, the combination with a wheel having a plurality of rows of type characters of different lengths arranged thereon and provided with a plurality of radially disposed stops of different lengths, a platen coöperating with the printing wheel and a controlling member coöperating with said stops, of an actuating member for the platen, a yielding connection between the platen actuating member and the controlling member, and a transversely movable carriage having a rack, a feeding pawl coöperating with the latter, devices for moving the pawl in one direction along the rack during the movement of the platen into printing position, said devices being governed in their movement by the controlling member and means for restoring the platen actuating member and the feeding pawl actuating devices into their normal position and to advance the carriage.

5. In a check printing machine, the combination with an adjustable wheel having type characters thereon arranged in rows, a stop plate on said wheel having radially disposed stop shoulders of different lengths, a platen and a lever for operating it, of a carriage, pawl and ratchet mechanism for moving the carriage in one direction, a lever for actuating the platen, a controlling member coöperating with said stop shoulders and connected to and governing the movements of said pawl and ratchet devices and a yielding connection between the controlling member and the platen operating lever.

6. In a printing machine, the combination with a printing wheel having a plurality of rows of type characters, a platen coöperating therewith and a member for operating it, a carriage guided in a path transversely to the face of the wheel and devices actuated by the platen operating member for intermittently advancing said carriage, of a work piece clamp on the carriage movable in a direction parallel to the plane of rotation of the wheel and means for releasing the carriage from its feeding mechanism adapted to be operated by the clamp when in one position of adjustment on the carriage.

7. In a printing mechanism, the combination with a printing member having rows of printing characters thereon, a platen coöperating therewith and a member for operating it, of a carriage movable in the direction of the rows of printing characters, pawl and ratchet mechanism for advancing said carriage intermittently and operating connections between it and said platen operating member, a bar on the carriage coöperating with one of the parts of said pawl and ratchet mechanism for disengaging them, a workpiece clamp movable transversely on the carriage, said bar and clamp being adapted to coöperate when the latter is in one position of adjustment to move the former into releasing position.

8. In a printing mechanism, the combination with a printing member having rows of printing characters thereon, a platen coöperating therewith and a member for operating it, of a carriage movable in the direction of the rows of printing characters, pawl and ratchet mechanism for advancing said carriage intermittently comprising a part mounted on the carriage and a part movable relatively thereto and operating connections between the latter and the platen operating member, a releasing bar on the carriage coöperating with the pawl to disengage it, and a workpiece clamp movable transversely of the carriage having a cam surface coöperating with a portion of the bar for moving it into releasing position when the clamp is in one position of adjustment.

9. In a printing machine, the combination with a revoluble wheel provided with printing characters, a platen arranged beneath it and a member for operating the platen into engagement with the wheel, of a carriage arranged in front of and beneath the wheel and guided to move parallel to the axis thereof and provided at one end with a rearwardly extending projection and a work piece clamp adapted to move across said carriage in a direction transverse to the axis of the printing wheel.

10. In a printing apparatus, the combination with a revoluble wheel provided with printing characters, a platen arranged beneath it and a member for operating the platen into engagement with the wheel, of a carriage movable in a direction parallel to the axis of the wheel comprising a plate arranged beneath and in front of the wheel, having at one end a rearwardly extending portion projecting beyond the end of the wheel and provided with a guide and a work piece clamp carried on the guide and adapted to be adjusted thereon to position the work piece between the wheel and platen.

11. In a printing apparatus, the combination with a revoluble wheel provided with printing characters, a platen arranged beneath it and a member for operating the platen into engagement with the wheel, of a carriage movable in a direction parallel to the axis of the wheel comprising a plate arranged beneath and in front of the wheel, having at one end a rearwardly extending portion projecting beyond the end of the wheel and a work piece clamp movable transversely of the carriage, a rack bar on the carriage, a pawl coöperating therewith and connected to the platen operating member, a bar for disengaging the pawl and coöperating projections on the bar and work clamp for moving the bar into releasing position when the work clamp is in its normal position.

12. In a machine of the character described, the combination with a printing wheel, a platen and a member for operating it, of a movable carriage having a rack bar, a feeding pawl coöperating therewith and means actuated by the platen operating member for reciprocating it, a detent engaging the rack for holding the carriage in its advanced position, a releasing member on the carriage and means operated thereby for retracting the detent and feeding pawl into inoperative positions; and means for retracting the carriage.

13. In a check printing machine, the combination with a wheel provided with printing characters arranged in rows of different lengths, a stop plate moving with the wheel and provided with stop shoulders of different lengths coördinate to the lengths of the respective type rows, a platen coöperating with the wheel and a member for operating it, and a carriage arranged below the wheel and in front of the platen and guided to move in a direction parallel to the axis of the wheel, of intermittently operating feeding devices for advancing the carriage, a member for actuating them which is set upon movement of the platen into printing position, and a pivoted controlling member coöperating with the stop plate and having a portion offset to provide clearance in line with the space between the printing wheel and the platen when the latter is retracted, said member being arranged to control the feeding movement of the carriage, and operating connections between the platen operating member, the controlling member and the carriage feeding devices.

14. In a printing apparatus, an adjustable printing wheel having thereon a plurality of type forms of various lengths disposed with their reading directions parallel with the axis of said wheel; a gage adjustable with said printing wheel; a platen having a single impression surface for coöperation with all of said type forms; an actuating member for effecting a relative printing movement of said printing wheel and platen; a work carriage having a feeding movement independent of said platen parallel with the axis of said printing wheel; and a carriage actuating mechanism, operated by said actuating member, and including a feed controlling device coöperating with said gage, for imparting intermittent feeding movements to said carriage proportional to the lengths of the type forms impressed.

15. In a printing apparatus, a rotatable printing wheel having thereon a plurality of type forms of various lengths disposed with their reading directions parallel with the axis of said wheel; a gage fixed to said wheel for rotation therewith; a platen having a single impression surface for coöperation with all of said type forms; an actuating member for moving said platen into contact with said type forms; a work carriage having a feeding movement independent of said platen parallel with the axis of said printing wheel, and a carriage actuating mechanism operated by said actuating member and including a feed controlling device coöperating with said gage, for imparting intermittent feeding movements to said carriage proportional to the lengths of the type forms impressed.

16. In a printing apparatus, a casing having a base portion and an upper portion overhanging said base portion and forming therebetween a slot adapted to receive checks and similar paper forms; a rotatable printing wheel in said upper casing portion having thereon parallel with the axis thereof a plurality of type forms of various lengths; a gage in said upper casing portion rotatable with said printing wheel; a work carriage on said base portion of said casing having a feeding movement parallel with the axis of said printing wheel; a platen in said base portion of the casing; an actuating member for effecting a relative printing movement of said printing wheel and platen; and a carriage actuating mechanism operated by said actuating member and including a feed controlling device coöperating with said gage, for imparting intermittent feeding movements to said carriage proportional to the lengths of the type forms impressed.

17. In a printing apparatus, a casing having a base portion and an upper overhanging portion forming therebetween an exteriorly opening slot adapted to receive checks and similar paper forms; a rotatable type carrier in said upper portion of the casing provided with a plurality of type forms of various lengths extending parallel with the axis of said carrier; selective means for rotating said carrier to bring any desired type form to printing position; a platen in said base portion of the casing having a single impression surface for coöperation with all of said type forms; feeding mechanism including a gage, for advancing the work parallel with the axis of said carrier variable distances corresponding with the lengths of the type forms printed; and an actuating member, independent of said selective means, for effecting a relative printing movement of the type forms and platen, and actuating said feeding mechanism.

18. In a printing apparatus, a casing having a base portion and an upper portion overhanging said base portion to form a work receiving space therebetween; a shaft in said upper casing portion; a type carrier on the shaft having a plurality of type forms of various lengths; a gage on said shaft; feeding mechanism for advancing the work parallel with said shaft variable distances determined by the gage; a platen in the base portion of the casing having a single impression surface coacting with all of said type forms; actuating means for effecting the relative approach and separation of the selected type and the platen and the operation of the feeding mechanism; and a manually operable member mounted on the shaft of the type carrier for rotating said shaft to bring any desired type form to printing position and to set the gage, without movement or adjustment of the actuating means.

LIBANUS M. TODD,
CHARLES G. TIEFEL.

Witnesses:
 G. WILLARD RICH,
 RUSSELL B. GRIFFITH.

Copies of this patent may be obtained for five cents each, by addressing the "Commissioner of Patents, Washington, D. C."